United States Patent
Piccinini et al.

(10) Patent No.: US 8,898,245 B2
(45) Date of Patent: *Nov. 25, 2014

(54) EXTENDING MEMORY CAPACITY OF A MOBILE DEVICE USING PROXIMATE DEVICES AND UNICASTING

(75) Inventors: Sandro Piccinini, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/437,249

(22) Filed: Apr. 2, 2012

(65) Prior Publication Data

US 2012/0191812 A1 Jul. 26, 2012

Related U.S. Application Data

(63) Continuation of application No. 12/963,831, filed on Dec. 9, 2010, now abandoned.

(51) Int. Cl.
*G06F 15/167* (2006.01)
*H04L 29/06* (2006.01)
*H04L 29/08* (2006.01)

(52) U.S. Cl.
CPC .............. *H04L 67/06* (2013.01); *H04W 14/023* (2013.01); *H04L 65/1006* (2013.01); *H04L 67/10* (2013.01); *H04L 67/18* (2013.01)
USPC .............................. 709/212; 370/328; 725/32

(58) Field of Classification Search
CPC . H04L 65/1006; H04L 65/605; H04L 67/104; H04L 65/4076; H04L 67/108; H04L 65/105; G06F 9/3834
USPC ............................................ 370/328; 725/32
See application file for complete search history.

(56) References Cited

U.S. PATENT DOCUMENTS 7,058,722 B2  6/2006  Ikami et al.
7,941,123 B2  5/2011  Yang et al.
(Continued)

FOREIGN PATENT DOCUMENTS

WO     2005125223 A1    12/2005

OTHER PUBLICATIONS

Piccinini et al., "Method and System for Extending Memory Capacity of a Mobile Device using Proximate Devices and Unicasting," U.S. Appl. No. 12/963,831, filed Dec. 9, 2010, 33 pages.

(Continued)

*Primary Examiner* — Dustin Nguyen
*Assistant Examiner* — Hao Nguyen
(74) *Attorney, Agent, or Firm* — Yee & Associates, P.C.; Jeffrey S. LaBaw (57) ABSTRACT

An improved download capability for mobile devices, without requiring increasing of the local memory of such devices, by providing a set of multimedia devices with the capability to create a cooperative download grid where multiple instrumented devices can be aggregated together according to predefined profiles. This capability is useful in at least two different scenarios. The first is when a SIP enabled device must download a large file having a capacity that is larger than the available memory of the SIP device. The second is when a SIP enabled device must download a file but cannot be connected for a long enough time to accomplish the download. If the SIP device is in proximity to other compatible devices such as Voice over Internet Protocol (VoIP) or Session Initiation Protocol (SIP), these devices are operable to be dynamically aggregated to provide a download grid with multiprotocol support that allows optimized downloading.

4 Claims, 8 Drawing Sheets

(56) References Cited

U.S. PATENT DOCUMENTS

| | | | |
|---|---|---|---|
| 8,013,247 B2 | 9/2011 | Werth et al. | |
| 2002/0016801 A1 | 2/2002 | Reiley et al. | |
| 2002/0059400 A1* | 5/2002 | Ikami et al. | 709/219 |
| 2003/0069921 A1* | 4/2003 | Lamming et al. | 709/203 |
| 2005/0071361 A1* | 3/2005 | Hettish et al. | 707/102 |
| 2006/0031509 A1 | 2/2006 | Ballette et al. | |
| 2007/0037563 A1* | 2/2007 | Yang et al. | 455/418 |
| 2007/0118866 A1* | 5/2007 | Chen | 725/87 |
| 2007/0153709 A1 | 7/2007 | Choi | |
| 2007/0172045 A1* | 7/2007 | Nguyen et al. | 379/202.01 |
| 2008/0102793 A1 | 5/2008 | Ananthanarayanan et al. | |
| 2008/0165701 A1 | 7/2008 | Ananthanarayanan et al. | |
| 2008/0250024 A1* | 10/2008 | Kvm et al. | 707/10 |
| 2008/0299988 A1 | 12/2008 | Dawson et al. | |
| 2009/0031390 A1* | 1/2009 | Rajakarunanayake et al. | 725/142 |
| 2009/0150697 A1 | 6/2009 | Yang | |
| 2009/0209235 A1* | 8/2009 | Lawler et al. | 455/413 |
| 2009/0282433 A1* | 11/2009 | Petta | 725/32 |
| 2010/0085916 A1* | 4/2010 | Yu et al. | 370/328 |
| 2010/0144330 A1* | 6/2010 | Ahlin | 455/418 |
| 2011/0047248 A1 | 2/2011 | Park et al. | |
| 2011/0126060 A1* | 5/2011 | Grube et al. | 714/48 |
| 2011/0145373 A1* | 6/2011 | Awad et al. | 709/220 |
| 2012/0079120 A1 | 3/2012 | Foti | |
| 2012/0131125 A1 | 5/2012 | Seidel et al. | |
| 2012/0270526 A1 | 10/2012 | DeFroment et al. | |
| 2013/0166772 A1* | 6/2013 | Kekki | 709/234 |

OTHER PUBLICATIONS

Piccinini et al., "Method and System for Extending Memory Capacity of a Mobile Device using Proximate Devices and Multicasting," U.S. Appl. No. 12/963,864, filed Dec. 9, 2010, 33 pages.

Piccinini et al., "Extending Memory Capacity of a Mobile Device using Proximate Devices and Multicasting," U.S. Appl. No. 13/439,327, filed Apr. 4, 2012, 33 pages.

Sambasivan et al., "Network Memory Among Mobile Devices", IEEE International Conference on Pervasive Services, IEEE, 2007, pp. 153-156.

Chu et al., "Mobile OGSI.NET: Grid Computing on Mobile Devices", Proceedings of the Fifth IEEE/ACM International Workshop on Grid Computing, IEEE, 2004, pp. 1-10.

Lima et al., "Peer-to-Peer Resource Discovery in Mobile Grids", Proceedings of the third international workshop on Middleware for grid computing, ACM, 2005, pp. 1-6.

Kurkovsky et al., "Agent-Based Distributed IDA Search Algorithm for a Grid of Mobile Devices", Proceedings of The 7th World Multi-Conference on Systemics, Cybernetics and Informatics (SCI-2003), Orlando, FL, Jul. 2003, pp. 1-6.

Kang et al., "Mobile Peer Membership Management to Support Multimedia Streaming", Proceedings of the 23rd International Conference on Distributed Computing Systems, IEEE, 2003, pp. 1-6.

Jung et al., "BlueTorrent: Cooperative Content Sharing for Bluetooth Users", Pervasive and Mobile Computing, Elsevier Science Publishers B. V., 2007, pp. 1-26.

Jung et al., "BlueTorrent: Cooperative Content Sharing for Bluetooth Users", PerCom '07. Fifth Annual IEEE International Conference on Pervasive Computing and Communications, White Plains, NY, pp. 47-56 Jun. 13, 2007.

USPTO Office Action dated Feb. 1, 2013, regarding U.S. Appl. No. 13/439,327, 15 pages.

USPTO Office Action dated Feb. 28, 2013, regarding U.S. Appl. No. 12/963,831, 17 pages.

USPTO Office Action dated Feb. 1, 2013, regarding U.S. Appl. No. 12/963,864, 15 pages.

Final Office Action dated Aug. 27, 2013, regarding U.S. Appl. No. 12/963,831, 31 pages.

Final Office Action dated Aug. 22, 2013, regarding U.S. Appl. No. 12/963,864, 36 pages.

Final Office Action dated Aug. 21, 2013, regarding U.S. Appl. No. 13/439,327, 37 pages.

Office Action dated Mar. 26, 2014, regarding U.S. Appl. No. 13/439,327, 33 pages.

* cited by examiner

EXTENDING MEMORY CAPACITY OF A MOBILE DEVICE USING PROXIMATE DEVICES AND UNICASTING

This application is a continuation of and claims the benefit of priority to U.S. patent application Ser. no. 12/963,831, filed on Dec 9, 2010 and entitled "method and System for Extending Memory Capacity of a Mobile Device using Proximate Device and Unicasting", which is hereby incorporated by reference.

BACKGROUND

1. Field

The disclosure relates generally to extending operational capabilities of mobile devices, and more specifically to extending file download capabilities of mobile devices having diminished memory capacity.

2. Description of the Related Art

In this day and age, with the increasing need to deliver multimedia content to the widest variety of users and devices, the lack of sufficient device memory space of where to store the content, and then use it, is being encountered more frequently.

The Session Initiation Protocol (SIP) is a signaling protocol defined by an Internet Engineering Task Force (IETF) and widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. The new SIP enabled devices allow users to be reached by every content type (voice, video, images, and data), including mixed content, and signal their presence or availability by publishing their state to a presence server.

The new generation mobile phones are usually sold with a small memory card, which afterwards, can be extended with greater and more expensive cards. And even when extended, for example to 512 MB, memory can be partially occupied when there is the need of downloading a video-conference or other big multimedia files, so that there is not enough free space and not enough time to select data to be deleted to free memory.

It often happens in specific conditions or during specific events like a business meeting in which multiple devices are available but each one of them cannot work with other ones in order to have a cooperative download of a multimedia file that may provide an optimized and cheaper download method.

The following described techniques address these issues.

SUMMARY

A method for downloading to a file to a device, comprising steps of receiving, at the device, a first portion of the file, with the file having a greater size than available memory within the device; and sending, by the device, the first portion of the file to another device in physical proximity to the device while the downloading of the file to the device is still pending.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A method, system and program product are provided to improve the download capability of mobile devices such as a mobile phone, without requiring continuous increasing of the local memory of such devices, by providing a set of multimedia devices with the capability to create a cooperative download grid where multiple instrumented devices can be aggregated together according to predefined profiles.

This capability is useful in at least two different scenarios. The first scenario is when a SIP enabled device must download a large file having a capacity that is larger than the available memory of the SIP device. The second scenario is when a SIP enabled device must download a file but cannot be connected for a long enough time to accomplish the download. If the SIP device is in proximity to other compatible devices such as Voice over Internet Protocol (VoIP) or Session Initiation Protocol (SIP), these devices are operable to be dynamically aggregated to provide a download grid with multiprotocol support that allows optimized downloading.

In one embodiment, a method is provided for downloading to a device a file having a greater size than available memory within the device is provided, including steps of: receiving, at the device, a first portion of the file; and sending, by the device, the first portion of the file to another device in physical proximity to the device while the downloading of the file to the device is still pending.

In another embodiment, a method is provided for downloading a file by a data processing system comprising a data processor and a memory, including steps of: the data processing system receiving device properties associated with each device of a plurality of devices; the data processing system partitioning the file into a plurality of file extents based upon the device properties; the data processing system establishing a communication session with the each device to form a plurality of communication sessions; and the data processing system sending the plurality of file extents to the plurality of devices using the plurality of communication sessions.

In yet another embodiment, a data processing system is provided the includes a data processor coupled to a memory, where the data processor is operable for executing instructions in the memory to perform steps of: receiving device properties associated with each device of a plurality of devices; partitioning the file into a plurality of file extents based upon the device properties; establishing a communication session with the each device to form a plurality of communication sessions; and sending the plurality of file extents to the plurality of devices using the plurality of communication sessions.

Figure 1:
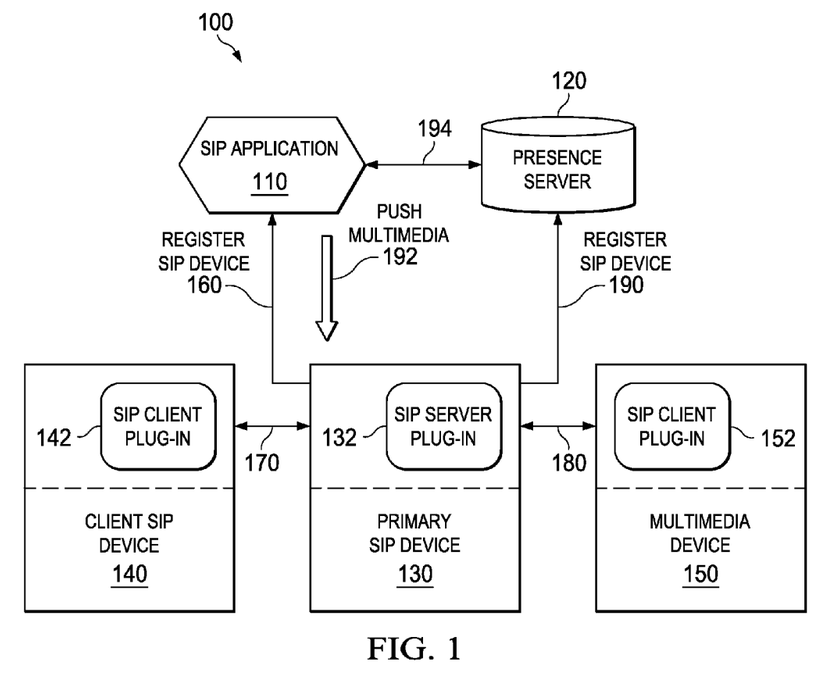
FIG. 1 is an illustration of a schematic diagram of the overall system that provides cooperative grid download functionality.

Turning now to FIG. 1, an illustration of a schematic diagram of the overall system that provides the cooperative grid download functionality is shown at 100. Included in system 100 is a SIP application 110, a presence server 120, a primary SIP device 130, a client SIP device 140 and a multimedia device 150. The primary SIP device 130 includes a SIP server plug-in 132 that is used to facilitate communication between the primary SIP device 130 and the SIP application 110 using communication paths 160 and 192. This SIP server plug-in 132 is also used to facilitate communication between the primary SIP device 130 and the presence server 120 using communication path 190. The client SIP device 140 includes a SIP client plug-in 142 that is used to facilitate communication between the client SIP device 140 and the SIP server plug-in 132 of primary SIP device 130 via communication path 170. The multimedia device 150, which in the preferred embodiment is a multimedia player such as an audio/video player that plays multimedia files, also includes a SIP client plug-in 152 that is used to facilitate communication between the multimedia device 150 and the SIP server plug-in 132 of primary SIP device 130 via communication path 180.

The primary SIP device 130 can be considered to be a local facilitator that is used to coordinate/manage the downloading of data from the SIP application 110 to itself and to other local devices in physical proximity to the primary SIP device 130, such as client SIP device 140 and multimedia device 150. For example, there may be a teleconference in progress, where users of these devices 130, 140 and 150 are all in attendance in a particular meeting room, and therefore are in physical proximity to one another. These devices are thus able to communicate with one another using a short-range network such as a Bluetooth™ network (Bluetooth is a trademark of Bluetooth SIG which is headquartered in Kirkland, Wash.), an infrared-based network, a WiFi network, or any other connection types available between the primary and other local devices. This primary SIP device 130 understands which devices it can connect to, and the properties of each of such devices. As will be further described below, this primary SIP device 130, by way of the SIP server plug-in 132, is able to download an entire file (via Universal Mobile Telecommunications System (UMTS) in the preferred embodiment)—that is larger than the amount of available memory within the primary SIP device 130—by periodically moving segments of the downloaded file from its memory to the memory of other connected devices such as client SIP device 140 and multimedia device 150 during such file downloading process. As will also be further described below, this primary SIP device 130 is used to initially set-up the operating environment whereby different devices such as client SIP device 140 and multimedia device 150 can themselves directly download into their respective memories different segments/portions of the entire file from the SIP application 110 in order to reduce the amount of overall time required to download the file due to such different parts/portions of the overall file being concurrently downloaded in parallel. In such a parallel download scenario, the segments can subsequently be exchanged/shared amongst the devices 130, 140 and 150 using a Bluetooth™ network or other similar local inexpensive connectivity capability such as infrared or WiFi.

A user is able to configure the extended memory management system that is locally orchestrated by the primary SIP device 130 using multiple configuration profiles that, for example, manage the multimedia file in real time when continuously downloading a new file portion and moving already played media file(s). The move destination can be configured in the profile, and, if the configured location is not available, a list of available locations is displayed to the user so that they can choose where to move the media file(s). Alternatively, a previously received segment of a file currently being downloaded could be moved to another device while concurrently receiving a subsequent segment of the file. In yet another embodiment, a given received segment may specify what device the received segment should be moved to by the receiving device.

The profile is used for configuring which devices to use for which action. The list of available devices (that is, locations) is displayed to the user when they decide to configure the profile. The user associates each or a subset of those locations to a profile. In the profile, the user then associates a behavior to each of the selected locations from a list of predefined standard behaviors. For example, the user can select device1 and device2 for profile1 and configure device1 to just store already played file portions, and device2 to hold portions of file that have not already been played. During the download, then, the first profile in the list is selected, and, if the related devices are capable of performing the configured action, the profile is chosen and implemented; otherwise the next profile in the list is evaluated. If no profile has been configured or can be applied, the default behavior is implemented (that is, every available device can be leveraged for every action).

The central SIP application 110 manages the end-to-end service and owns or manages the multimedia file(s) that are downloaded (such files are not shown in the figure, and may be located in a local storage of a server running the central SIP application, or remotely via a network). This central SIP application 110 is operable to communicate with each of the devices 130, 140 and 150 regardless of the fact that they are registered with the overall cooperative grid download system. This SIP application 110 communicates with such devices using an SIP protocol that is independent of the underlying transport layer, and can be run on a Transmission Control Protocol (TCP), a User Datagram Protocol (UDP), or Stream Control Transmission Protocol (SCTP). Alternatively, an HTTP-based system could be used in lieu of the SIP application/protocol. This primary SIP application 110 is operable to dynamically partition a given multimedia file to be downloaded into multiple extents/segments according to the respective properties of the devices participating in cooperative grid download process, the network channels that are used for such download, and configurable rules. The network channel can be any available network communication means (LAN, UMTS, etc.) that can be leveraged by both SIP application container (that is an Application Server) and the device. The SIP application retrieves the Application Server available communication means from the container and retrieves the devices available communication means from the primary device (both are ordered by preference), then the two lists are matched for each device and a communication means is chosen. Any currently available file partition technique can be leveraged, for example Binary space partitioning (BSP) or heuristic MDFP algorithms. The central SIP application 110 then routes the partitioned file accordingly.

The presence server 120 is a standard presence server known to those of ordinary skill in the art, such as the IBM™ WebSphere™ Presence Server available from IBM Corporation of Armonk, N.Y. (IBM and WebSphere are trademarks of IBM Corporation). Such a presence server is generally operable by a service provider network, such as is used to provide cellular telephone services, which help create services that make customer communications more productive by utilizing presence information from multiple sources. For example, such a presence server can interface between applications and network elements based on industry-standard interfaces for flexible service oriented architecture deployments such as Simple Object Access Protocol (SOAP).

As previously alluded to, the primary component that facilitates the extended memory grid is the SIP server plug-in 132 that works in conjunction with the SIP client plug-ins 142 and 152 to facilitate a localized communication connection with other devices in physical proximity to the primary SIP device 130, such as devices 140 and 150, in order to share a download session. This SIP server plug-in 132 is in addition to, and operates with, a standard SIP phone and its associated operations. The SIP server plug-in 132 and SIP client plug-ins 142 and 152 are collectively referred to as Shared Session Plug-ins (SSP) since they provide client devices such as 140 and 150 with an ability to share a download session with the primary SIP device 130.

For example, in the case of a shared session between an SIP device such as client SIP device 140 and a non-SIP device such as multimedia device 150, the primary SIP device 130 can download an entire file, such as a multimedia file, which is larger in size than the internal memory capacity of the primary SIP device 130, and during the download it can periodically move segments of that file to other connected devices using a local connection such as a Bluetooth™ network. Alternatively, if the aggregated devices are SIP enabled, the different SIP devices can each download different portions of the same file to save time due to such concurrent parallel downloading of the individual file portions. Once these portions have been individually downloaded by the plurality of SIP devices, the primary SIP device 130 is responsible for management of the download session. In particular, the primary SIP device 130 will prompt the user to perform one of these actions:

1—Make room in the primary SIP device for the other segments to be imported from secondary devices. As soon as the user confirms and the space is checked, the primary SIP device will trigger the other segments download leveraging a local connection; and 2—Play the local segments and removing the already played ones while retrieving the next segments from the secondary devices. This can be done if the SIP application divided the multimedia file in a way that each segment can be played. This information is also provided from the SIP application to the primary SIP device.

A multimedia SIP application 110 residing on any application server provides the multimedia files. This SIP application 110 is also equipped with a component that is able to actively interact with the presence server 120 via connection 194 in order to manage all the devices that participate in the shared session, but cannot be registered to the presence server 120 because they are not capable of publishing their presence. This SIP application 110 maintains a dynamic table that associates the registered SIP devices and the properties of non-SIP devices that share sessions with the SIP application 110. This table works as a kind of presence server for non-SIP devices, managed with the information returned by the primary SIP device 130. The SIP application 110 establishes the multimedia file partition according to device properties and configurable rules stored in the mapping table. The SIP application 110 is operable to route the multimedia content of a communication towards the devices sharing a session, according to the shared session properties defined by the primary SIP device 130.

In one embodiment, the primary SIP device 130 shields the presence server 120 from additional local devices involved in the session, acting as a helper role, thereby avoiding extensions/usage of presence server 120 when the primary SIP device 130 and other devices 140 and 150 are participating in a session with the SIP application 110.

The SIP server plug-in 132 installed on the SIP enabled cellular phone 130 provides the following functionalities:
  control over the establishment, management and termination of a Bluetooth™ network or infrared-based shared sessions with a non-SIP device; and
  proxy functionalities being able to communicate to the SIP application the possibility of sharing sessions, together with device characteristics of each device The SIP client plug-in 152 installed on the non-SIP multimedia device 150 provides client functionalities to the primary SIP device 130 for retrieving of device information and sharing of download sessions.

Thus, the primary SIP device 130 is able to start a shared session on demand, leveraging any SIP or non SIP device which can act as backup, virtual memory extension or parallel reception extension towards the primary SIP device 130. The SIP application 110 is able to retrieve the shared session properties and status from the primary SIP device 130, analyze each device capabilities and user configuration and establish work load management among the shared devices, and finally to properly subdivide the multimedia content and deliver the right file extent/portion to the right device.

Figure 2:
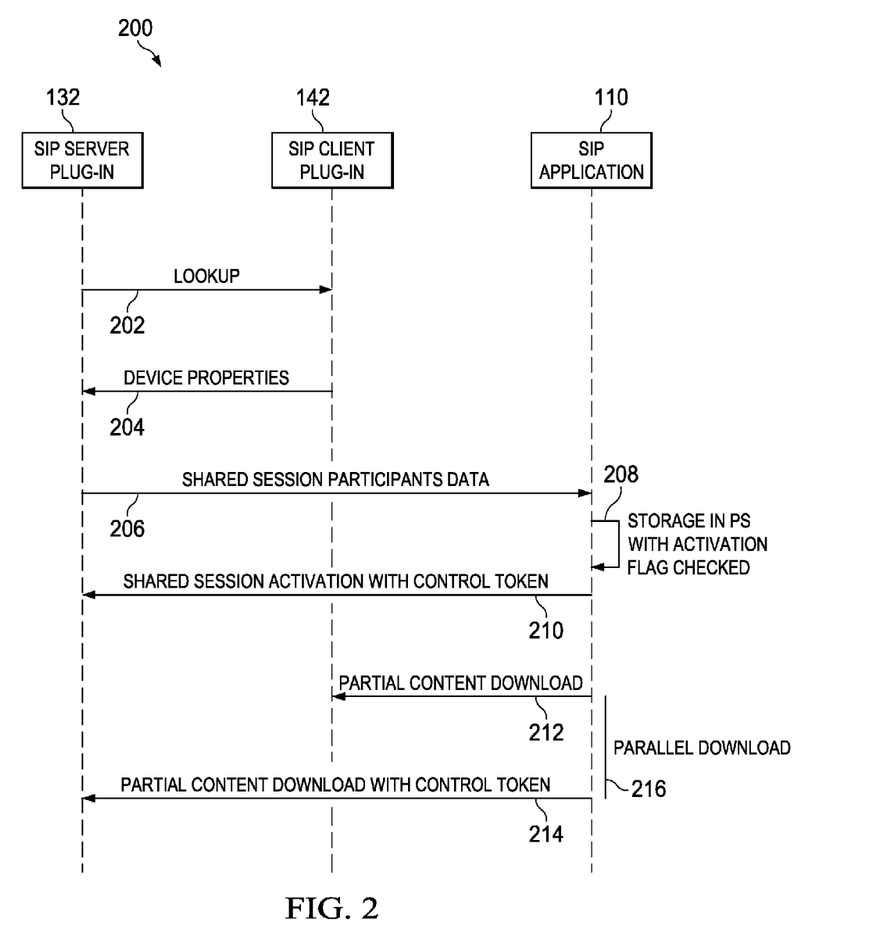
FIG. 2 is an illustration of a logical flow diagram of the overall system that provides cooperative grid download functionality.

Turning now to FIG. 2, the logical flow of the overall system is depicted at 200. The logical flow of the data download solution is as follows:

1. Each device is equipped with an SIP plug-in 132 or 142.
2. The primary SIP device 130 looks for devices in physical proximity to it with which to share a download session (element 202), and obtains device properties associated with such devices (element 204).
3. The primary SIP device 130 sends the connected devices' property information, also called shared session participants data, to SIP application 110 (element 206).
4. SIP application 110 creates a mapping table to simulate an additional extension of presence server 120. Optionally, this mapping table is stored in the presence server 120 with an 'Activation flag' that states if the shared session mechanism is enabled or not (element 208).
5. The SIP application 110 that downloads a multimedia content such as a media file contacts primary SIP device 130 and provides the primary SIP device 130 with a control token that will be used by the primary SIP device to manage a shared session (element 210).
6. The SIP application 110, based on the mapping table, initiates the download toward the targeted devices. This download is done directly if the devices are reachable through a suitable channel like an Ethernet connection (element 212). Alternatively, the SIP primary device connection (element 192 of FIG. 1) is leveraged such that a data exchange occurs between the primary SIP device and other devices using, for example, a Bluetooth™ connection. In this situation, where other devices such as elements 140 and 150 of FIG. 1 are not directly reachable from the SIP application 110, the entire file is downloaded as a plurality of file segments from the SIP application 110 directly to the SIP primary phone 130 using SIP server plug-in 132 (element 214), and during this main file download the primary SIP device 130 will store partial contents/extents/segments of the file on other devices such as elements 140 and 150 of FIG. 1.
7. Optionally, the SIP primary device can initiate other SIP sessions with other SIP enabled devices such as element 140 of FIG. 1, so that also in this case the main download of the whole file is done from the SIP application 110 to the primary SIP device 130. What changes in this optional processing is the ability to store partial contents of the file using additional SIP sessions instead of a Bluetooth™/infrared/WiFi link which may not be available.

Figure 3:
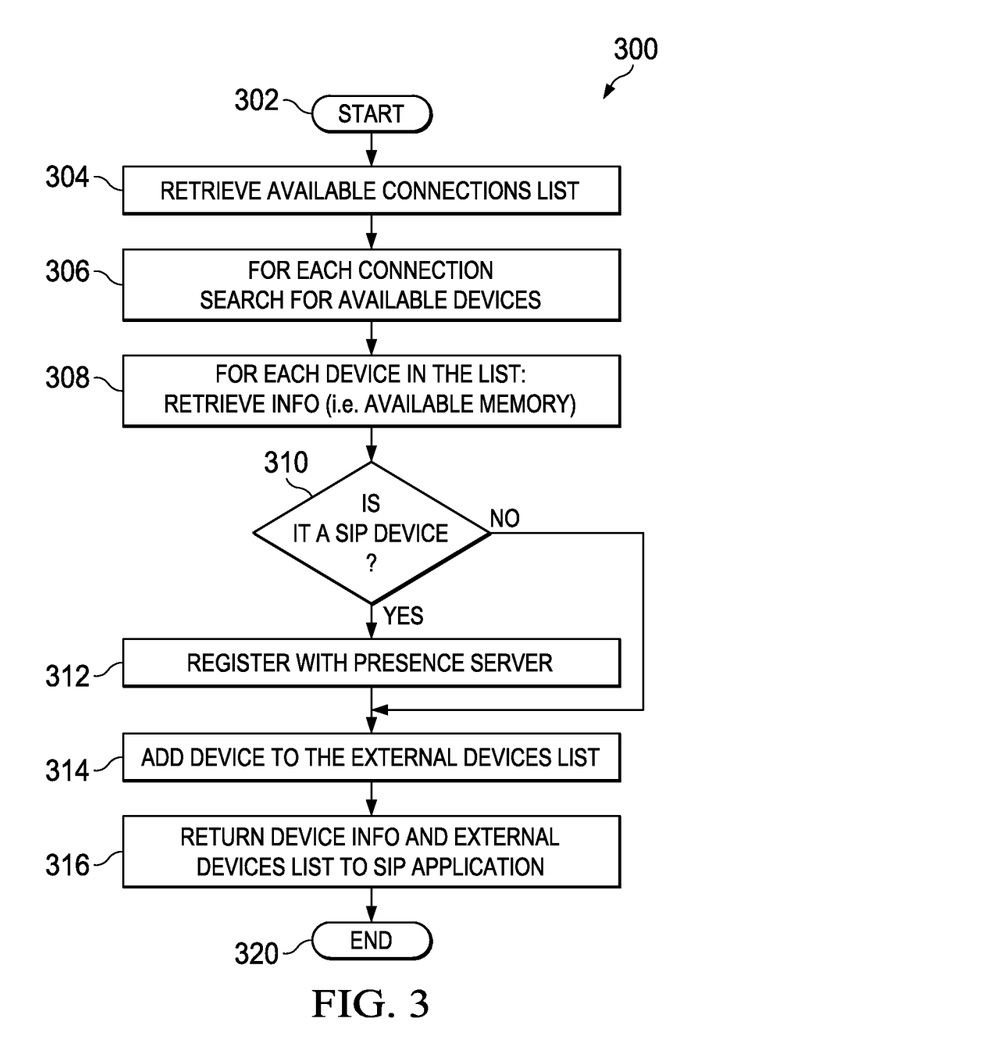
FIG. 3 is a flowchart illustrating the set-up operation of a primary SIP device.

Turning now to FIG. 3, there is a flowchart 300 showing the set-up operation of a primary SIP device such as primary SIP device 130 of FIG. 1. Processing begins at 302, and proceeds to 304 where primary SIP device 130 retrieves a list of available connections. For each available connection, the primary SIP device 130 searches for available devices that are accessible using such connection to generate a list of available devices, such as devices 140 and 150 of FIG. 1. These available devices would be the ones in close physical proximity to primary SIP device 130. For each such available device, the primary SIP device 130 retrieves device properties from such available device at 308. For example, the amount of available memory in each of the available devices could be retrieved, along with other device characteristics such as whether the device is a SIP-enabled device. At 310, a determination is made as to whether a given device is a SIP device using the device properties that was retrieved per step 308. If the given device is an SIP device, as determined at step 310, processing continues to step 312 where the primary SIP device 130 registers the detected SIP device, such as device 140 of FIG. 1, with the presence server 120 (of FIG. 1) via path 190 of FIG. 1. Processing then continues to step 314, which is also the next step if the given device is determined to not be an SIP device, where the given device is added to an external devices list. The device properties information, as determined at step 308, and the external devices list is returned to the SIP application at 316. This step coincides with element 206 of FIG. 2, where the shared session participant's data is sent by the SIP server plug-in 132 to the SIP Application 110. Processing then ends at 320.

Figure 4:
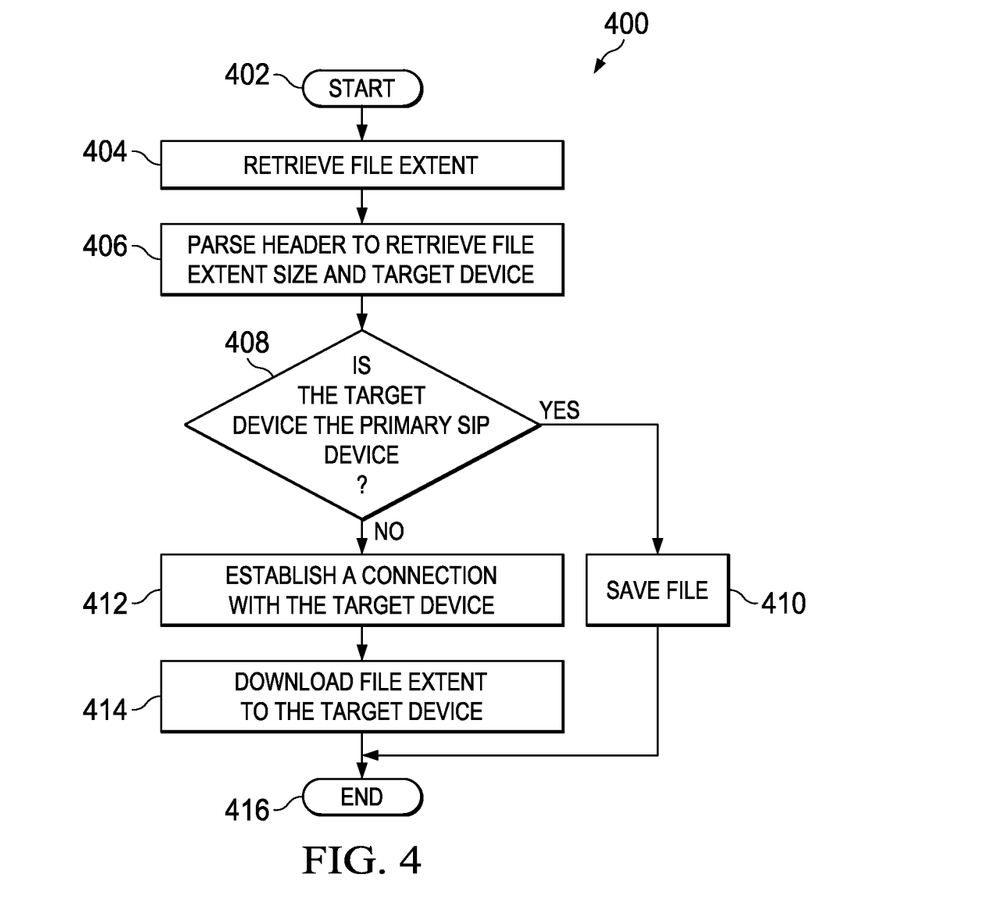
FIG. 4 is a flowchart illustrating a download operation of a primary SIP device.

Turning now to FIG. 4, there is a flowchart 400 showing a download operation being performed by a primary SIP device such as primary SIP device 130 of FIG. 1. Processing begins at 402, and proceeds to 404 where a file extent for a file is retrieved by the primary SIP device. This is the portion of the file being downloaded from the SIP application 110, as per 214 of FIG. 2. The header is parsed at 406 to retrieve the file extent size and the target device. At step 408, a determination is made by the primary SIP device 130 as to whether the target device is itself—i.e. the primary SIP device 130. If so, the file is locally saved by the primary SIP device at 410, and the process ends at 416. This is the normal behavior when downloading a file on a single device. If there is not enough space it will give an error. If the target device is not the client SIP device, as determined at step 408, processing continues to 412 where the primary SIP device establishes a connection with the target device, such as client SIP device 140 of FIG. 1. The file extent is then downloaded to the target device at 414, and processing then ends at 416. If the secondary devices are not reachable from the SIP application, the entire file is downloaded to the primary device. Then, if some external device is available and can be used for the cooperative download, it's leveraged as it's configured in the first valid configuration profile in the primary device. For example, one of these devices can be used to store portions of the file that have not been played yet, and another can be used to store already played portions, and so on. For the case where portions of the file are downloaded to different devices, a TOC (table of content) is downloaded to the primary SIP device so that it can compute which portion to retrieve from each external device. The TOC contains information about the devices containing file portions and which portions they hold. A specific file portion will be actually retrieved when it's configured in the chosen profile (a file portion may be retrieved from a specific device when it's needed for being played, when there's enough memory in the primary device to hold it—that is as soon as possible—and so on).

Figure 5:
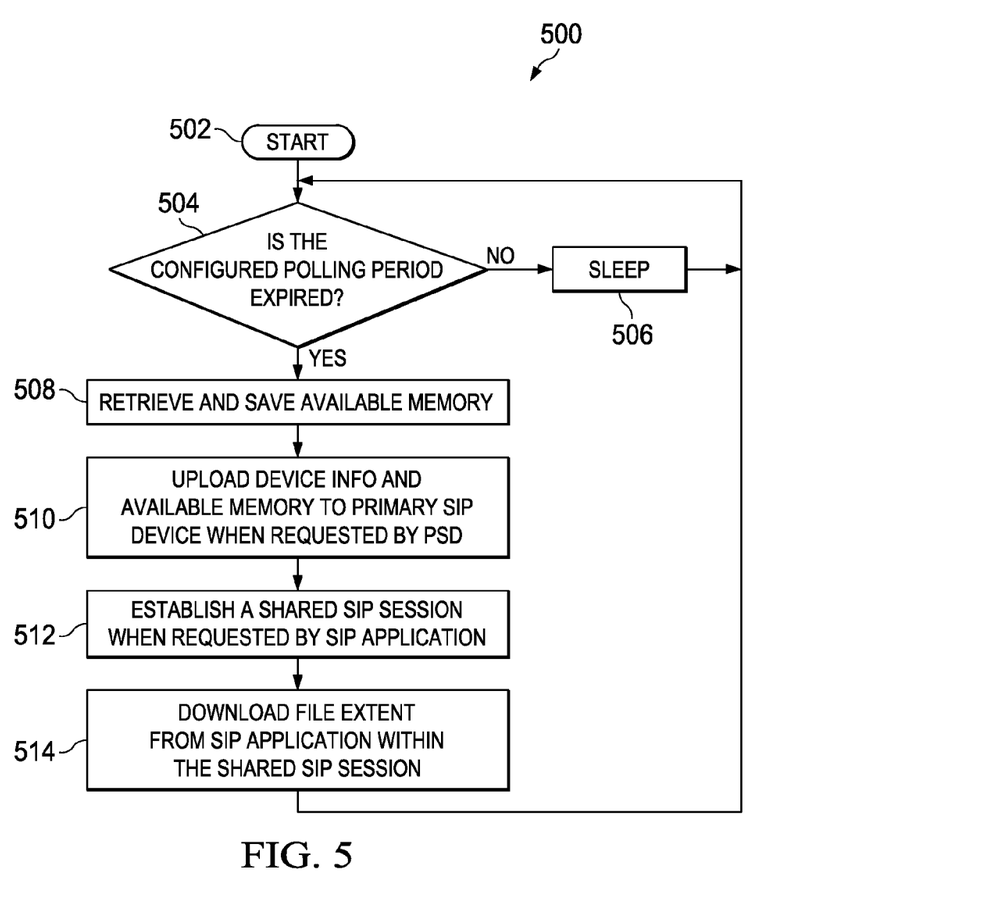
FIG. 5 is a flowchart illustrating the operation of a client SIP device.

Turning now to FIG. 5, there is a flowchart 500 showing the operation of a client SIP device such as client SIP device 140 of FIG. 1. Processing begins at 502, and proceeds to step 504 where a determination is made as to whether the configured polling period has expired. If such polling period has not expired, a sleep mode is entered at 506 to temporarily suspend active processing by the client SIP device 140 until the next time period occurs where the expired polling period is again checked at step 504. If the configured polling period has expired, as determined at step 504, the processing continues to 508 where the currently available memory within the client SIP device 140 is retrieved and saved as part of the device information/properties. At step 510, the device information and available memory is uploaded to the primary SIP device, such as device 130 of FIG. 1, when requested by the primary SIP device, as also depicted at 204 of FIG. 2. The client SIP device then establishes, when requested by the SIP Application 110 of FIG. 1, a shared SIP session with the SIP Application at 512. At step 514, a file extent is then downloaded from the SIP Application 110 of FIG. 1, with such download occurring within the shared SIP session, as also depicted at 212 of FIG. 2. Processing then repeats at step 504.

A similar process occurs when the file extent/segment is instead received from the primary SIP device. For example, the two modes for receiving data (from the SIP application or the primary SIP device) don't differ in the way the client SIP device behaves: in both cases the client SIP device receives a file portion (from SIP application or Primary device) and then it's asked for it when the SIP Primary device needs it. What differs is the way the file portion is received—in the first case using a SIP session, and in the second case using an available SIP Primary device connection like Bluetooth.

Figure 6:
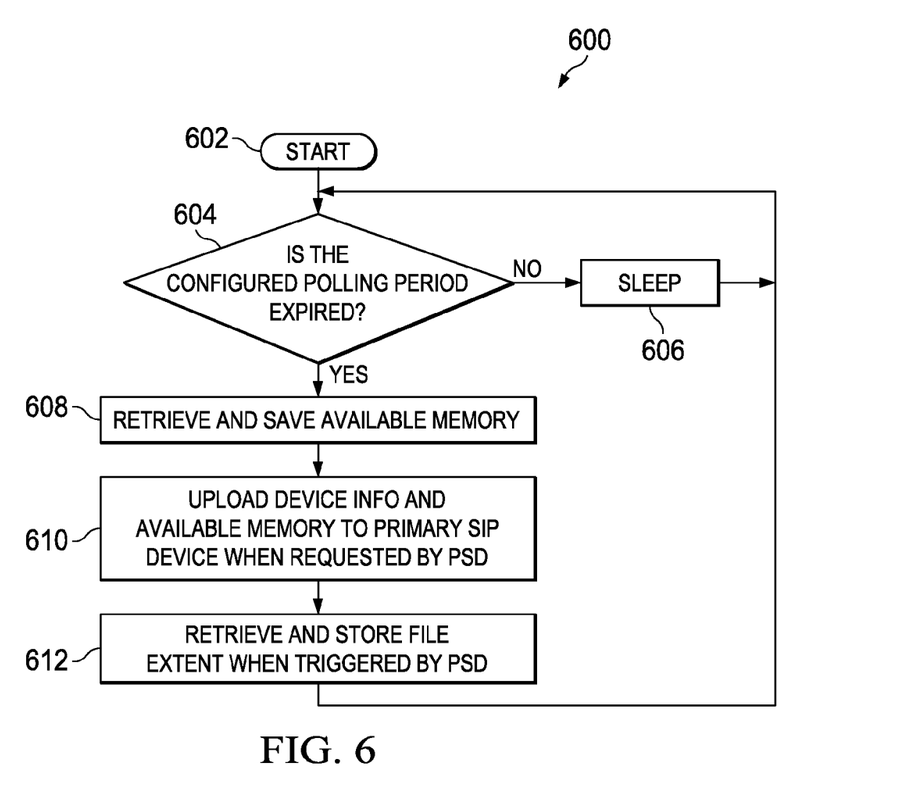
FIG. 6 is a flowchart illustrating the operation of a non-SIP device.

Turning now to FIG. 6, there is a flowchart 600 showing the operation of a non-SIP device such as multimedia device 150 of FIG. 1. Processing begins at 602, and proceeds to step 604 where a determination is made as to whether the configured polling period has expired. If such polling period has not expired, a sleep mode is entered at 606 to temporarily suspend active processing by the non-SIP device 150 until the next time period occurs where the expired polling period is again checked at step 604. If the configured polling period has expired, as determined at step 604, the processing continues to 608 where the currently available memory within the non-SIP device 150 is retrieved and saved as part of the device information/properties. At step 610, the device information and available memory is uploaded to the primary SIP device, such as device 130 of FIG. 1, when requested by such primary SIP device. The file extent is then retrieved from the primary SIP device and stored when triggered by the primary SIP device at 612. Processing then repeats at step 604.

Figure 7:
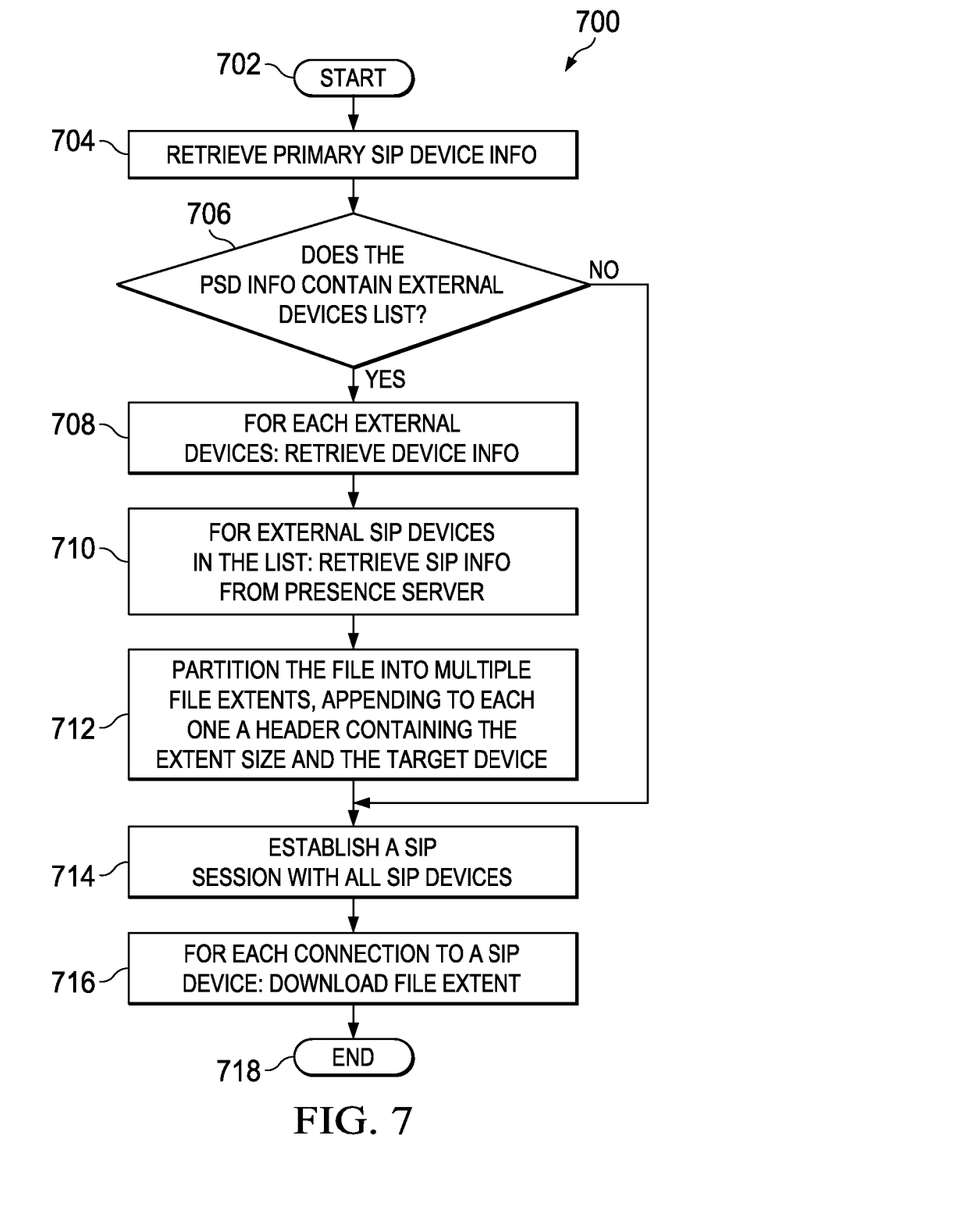
FIG. 7 is a flowchart illustrating the operation of a SIP application.

Turning now to FIG. 7, there is a flowchart at 700 showing the operation of a SIP application 110 of FIG. 1 executing on a server data processing system. Processing begins at 702, and proceeds to step 704 where the primary SIP device information is retrieved. This step is analogous to element 206 of FIG. 2. A determination is then made by the SIP Application at step 706 as to whether the device information/properties received from the primary SIP device contain an external devices list. If not, the SIP Application 110 establishes a SIP session with all of the SIP devices at 714. The SIP Application retrieves the list of SIP devices from the Presence Server, and if the list is empty no other device will participate in the download action (the list could be empty is there are no available external devices). Then, a file portion/extent is downloaded to each connected SIP device at 716, with the process ending at 718. Returning back to step 706, if the SIP application determines that the primary SIP device does contain a list of external devices (as per step 316 of FIG. 3), device information is retrieved for each of the external devices in the list at 708. Then, at step 710 the SIP Application 110 retrieves SIP information from the presence server 120 of FIG. 1 for external SIP devices contained in the external devices list, where such SIP information is a result of SIP registration step 312 of FIG. 3. At step 712, the desired file to be downloaded is partitioned into multiple file portions/extents, with each file extent having a header appended thereto that contains the particular file extent's size and the target device of where the file extent is to be sent to. This partitioning of the desired file into individual file extents for the external devices takes into account the available memory at each external device, as provided by the primary SIP device to the SIP Application at step 316 of FIG. 3. Processing then continues at steps 714 and 716 to establish an SIP session with the SIP devices and download the respective file extent for each connection to an SIP device, in similar fashion to what is done if it is determined that an external device list is not included in the primary SIP device-provided information as determined at step 706. The SIP Application 110 processing completes at 718.

The size of each file portion is computed taking into account the following:
  characteristic (speed, availability) of the network connection that will be leveraged to download it (in this case the more the connection is fast and stable, the greater the file portion size can be); and
  available space on the target device (with a configured threshold, that is we want to use up to 90% of the available space for a device).

Figure 8:
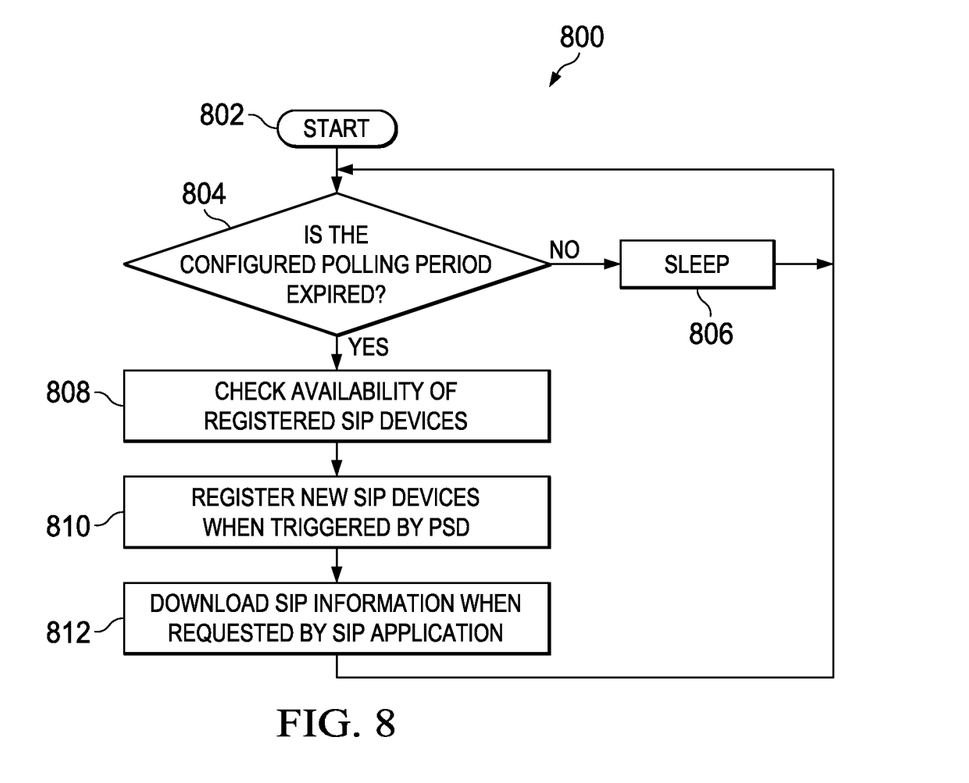
FIG. 8 is a flowchart illustrating the operation of a presence server.

Turning now to FIG. 8, there is a flowchart 800 showing the operation of a presence server 120 of FIG. 1 interacting with (i) SIP application 110 of FIG. 1 via communication link 194, and (ii) primary SIP device 130 via communication link 190. Processing begins at 802, and proceeds to step 804 where a determination is made as to whether the configured polling period has expired. If such polling period has not expired, a sleep mode is entered at 806 to temporarily suspend active processing by the presence server 120 until the next time period occurs where the expired polling period is again checked at step 804. If the configured polling period has expired, as determined at step 804, the processing continues to 808 where the availability of registered SIP devices is checked. In doing so, the connection that has been used to discover the external device is leveraged again to check that the same device can still be contacted (that is, a connection can still be established). This is done performing a dummy connection to the device. At step 810, new SIP devices are registered by the presence server 120 when triggered by the primary SIP device, via path 190 of FIG. 1, as per step 312 of FIG. 3. The presence server 120 then downloads, at step 812, SIP information requested by the SIP Application 110, as per step 710 of FIG. 7. Processing then repeats to step 804.

Thus, there is provided a method, system and program product to improve the download capability of mobile devices such as a mobile phone, without requiring continuous increasing of the local memory of such devices, by providing a set of multimedia devices with the capability to create a cooperative download grid where multiple instrumented devices can be aggregated together according to predefined profiles.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for downloading a file to a device, comprising steps of:
    receiving, at the device, a first portion of the file, with the file having a greater size than available memory within the device;
    sending, by the device, the first portion of the file to a SIP (Session Initiated Protocol) device in physical proximity to the device while the downloading of the file to the device is still pending, wherein the first portion of the file is sent via a session initiated protocol (SIP) session established between the device and the SIP device;
    receiving, by the device, the first portion of the file from the SIP device, wherein the first portion of the file is received via a session initiated protocol (SIP) session established between the device and the SIP device;
    receiving, at the device, a second portion of the file; and
    sending, by the device, the second portion of the file to a non-SIP device in physical proximity to the device via a non-SIP session while the downloading of the file to the device is still pending.

2. The method of claim 1, wherein the device, the SIP device and the non-SIP device are dynamically aggregated together to provide a download grid with multiprotocol support.

3. The method of claim 1, wherein the device comprises a SIP server plug-in configured to enable communication between the device and the SIP device, and communication between the device and the non-SIP device by coordinating downloading of the file from a SIP application to the device.

4. The method of claim 3, wherein the non-SIP device comprises a SIP client plug-in configured to provide client functionalities to the device for retrieving device information pertaining to the non-SIP device.

* * * * *